United States Patent [19]

Starks

[11] 4,315,995

[45] Feb. 16, 1982

[54] PREPARATION OF CATION-EXCHANGE RESIN

[75] Inventor: Charles M. Starks, Ponca City, Okla.

[73] Assignee: Conoco Inc., Ponca City, Okla.

[21] Appl. No.: 180,200

[22] Filed: Aug. 22, 1980

[51] Int. Cl.$^3$ .............................................. B01J 39/24
[52] U.S. Cl. ..................................................... 521/33
[58] Field of Search ......................................... 521/33

[56] References Cited

U.S. PATENT DOCUMENTS 2,291,226 7/1942 Higgins ................................. 521/33
3,345,284 10/1967 Ogden ................................... 521/33

OTHER PUBLICATIONS

Chem. Abstracts, vol. 69, 1968 20142a, P. P. Gertsen et al.
Chem. Abstracts, vol. 78, 1973, 163760x, Koizumi et al.
Chem. Abstracts, vol. 82, Entry 157199n, Ikariya, M., et al.
Chem. Abstract, vol. 68, Entry. 60193d.

*Primary Examiner*—William F. Hamrock
*Assistant Examiner*—Peter Kulkosky
*Attorney, Agent, or Firm*—Bayless E. Rutherford, Jr.

[57] ABSTRACT

A process for preparing a cation-exchange resin is disclosed. The process comprises:
(a) treating a chlorine-containing material, which is the distillation residue obtained by chlorinating or oxychlorinating a $C_2$–$C_{40}$ hydrocarbon, with a sulfonating agent,
(b) treating the admixture of step (a) with water and an organic solvent until the product shows a substantially neutral pH, and
(c) removing the volatile materials to obtain a solid material which is suitable for use as a cation-exchange resin.

8 Claims, No Drawings

PREPARATION OF CATION-EXCHANGE RESIN

FIELD OF THE INVENTION

The invention is in the general field of preparing cation-exchange resins. In particular it is in the field of preparing cation-exchange resins from a "waste material".

GENERAL BACKGROUND

The preparation of vinyl chloride, 1,2-dichloroethane, trichloroethylene, and other chlorinated hydrocarbons by chlorination or oxychlorination is well-known in the art. Unfortunately, the preparation of these materials leaves as by-products chlorine-containing materials for which there is no utility. These by-products tend to be toxic and pose a substantial disposal problem. The normal method of disposal of these by-products is by burning, although this is expensive since extra fuel must be added to burn the normally nonflammable chlorinated materials. Also, corrosion is very severe since both water and HCl are produced at high temperatures. The HCl produced is collected as an aqueous solution.

I have discovered that these by-products can be converted to useful products, ion exchange resins. Additionally, the process for converting these by-products to ion exchange resins also provide for recovery of a substantial portion of the chlorine values of the by-products as anhydrous HCl gas.

BRIEF SUMMARY OF THE INVENTION

Briefly stated, the present invention is directed to a process for preparing a cation-exchange resin wherein the process comprises:

(a) treating a chlorine-containing material, which is the distillation residue obtained by chlorinating or oxychlorinating a $C_2$–$C_{40}$ hydrocarbon, with an effective amount of a sulfonating agent, (b) treating the admixture of step (a) with water and an organic solvent until the product shows a substantially neutral pH, and (c) removing the volatile materials.

DETAILED DESCRIPTION

The materials used to prepare the cation-exchange resins are chlorine-containing distillation residues obtained as a by-product from the chlorination or oxychlorination of a variety of hydrocarbons, such as paraffins or olefins, containing at least two carbon atoms and as many as 40 carbon atoms.

For example, dichloroethanes, trichloroethanes, tetrachloroethanes, pentachloroethanes and hexachloroethanes are produced by direct reaction of chlorine with ethylene or ethane. Also, vinyl chloride, dichloroethylene, trichloroethylene, and tetrachlorethylene are produced by chlorination of oxychlorination of ethylene or ethane. Other di- or polychlorinated materials may be prepared by chlorination or oxychlorination of propylene, butadiene, 1-butene, 2-butene, isobutene, cyclobutene, cyclopentadiene, butane, pentane, pentenes, and higher hydrocarbons such as $C_6$–$C_{40}$ olefins and paraffins.

The distillation residues used in my process contain at least 35 percent by weight chlorine. Preferably, the distillation residues are liquid under column bottoms temperatures.

While the distillation residue resulting from the chlorination products described in the foregoing is used in my process, it is conceivable that the chlorination products per se can be used in the process. From a practical standpoint, it is not usually economically feasible to use the chlorination products per se as the feedstock.

Suitable sulfonating agents included oleum, concentrated sulfuric acid (e.g. 98 percent), dilute sulfuric acid (30–98 percent), and sulfur trioxide. If dilute sulfuric acid is used the water has to be removed during processing. As used herein the term sulfonating is equivalent to sulfating. This is because both reactions may occur in the treatment of the chlorine-containing distillation residue (CCDR).

A suitable amount of sulfonating agent is in the range of about 0.1 to about 50 parts by weight per part of CCDR.

On the same basis the preferred amount of sulfonating agent is in the range of about 0.1 to about 50 parts.

The sulfonation reaction is conducted under the following conditions.

|  | Suitable | Preferred |
|---|---|---|
| Temperature, °C. | 30–350 | 40–200 |
| Pressure, atm. | 1–400 | 1–20 |

Following the sulfonation reaction the reaction admixture is washed with water to remove excess (i.e. unreacted) sulfonating agent. Knowing this step is required any person skilled in the art can readily determine the required amount, which, typically is between 1 to 100 volumes per volume of resin produced.

The product is then washed with an organic solvent to remove unreacted organic material. A variety of organic solvents can be used. Examples of suitable solvents include alcohols, chlorinated hydrocarbons, ketones (e.g. acetone), naphtha, and hexane. Knowing this step is required any person skilled in the art can readily determine the required amount, which, typically is between 0.5 and 100 volumes per volume of resin produced.

Upon removal of solvents and drying there results an insoluble, carbonaceous, solid material containing 0.1 to 10 milliequivalents per gram of acid groups, such that the materials can function as an ion exchange resin.

In order to illustrate the nature of the present invention still more clearly the following example will be given. It is to be understood, however, that the invention is not to be limited to the specific conditions or details set forth in this example except insofar as such limitations are specified in the appended claims.

EXAMPLE

This example used a liquid chlorination material obtained as a residue from a commercial vinyl chloride plant. (1) An amount of 265 gram of the residue was mixed with 200 ml of concentrated sulfuric and slowly heated. A large volume of anhydrous HCl gas was evolved as the temperature was raised from 40° to 60° C., and gas continued to be evolved as the temperature was further increased. Heating was continued at 100°–110° C. for 7 hours, then the mixture was cooled to room temperature. Deionized water (500 ml) was added, and the mixture was thoroughly stirred until all of the black solid which had been present was suspended in liquid. The black solid residue was collected on the filter and then repeatedly washed with methanol and then with deionized water, until the residue, when suspended in water did not cause pH paper to show acid. The black solid was air dried, wt. 65 g. When this solid was suspended in deionized water, the water did not show an acidic pH; but, when potassium chloride solution (pH=7) was added to the suspension, the pH immediately dropped to 1, indicating that ion exchange had occurred, causing the production of free HCl. The black solid product was analyzed for sulfur (5.79 percent, corresponding to 1.8 milliequivalent/g) and titrated with sodium hydroxide solution (1.65 milliequivalent NaOH consumed per gram of solid) thereby indicating the ion exchange capacity of the solid.

(1) These residues, commonly referred to as "tars", contain many components (more than 20). The overall elemental composition is about 65-80 weight percent chlorine, 15-30 weight percent carbon, 3-10 weight percent hydroxy, plus minor amounts of oxygen. The composition of these distillation residues is variable since small changes in day-to-day operation of the plant have a strong influence on the composition.

Thus, having described the invention in detail, it will be understood by those skilled in the art that certain variations and modifications may be made without departing from the spirit and scope of the invention as defined herein and in the appended claims.

I claim:

1. A process for preparing a cation-exchange resin wherein the process comprises:
    (a) treating a chlorine-containing material, which is the distillation residue obtained by chlorinating or oxychlorinating a $C_2$–$C_{40}$ hydrocarbon, with an effective amount of a sulfonating agent,
    (b) treating the admixture of step (a) with an effective amount of water and an effective amount of organic solvent until the product is substantially free of sulfonating agents and is substantially free of materials which are soluble in common, organic solvents, and
    (c) removing the volatile materials to obtain an insoluble, carbonaceous solid material containing 0.1 to 10 milliequivalents per gram of acid groups, said process being characterized further in that the distillation residue of step (a) is a liquid under column bottoms temperature.

2. The process of claim 1 wherein the amount of sulfonating agent is from about 0.1 to about 50 parts by weight per part of chlorine-containing distillation residue.

3. The process of claim 2 wherein the sulfonating agent is selected from the group consisting of oleum, sulfuric acid and sulfur trioxide.

4. The process of claim 3 wherein the amount of water is from about 1 to about 100 parts by volume based on the resin produced.

5. The process of claim 4 wherein the organic solvent is selected from the group consisting of alcohols, chlorinated hydrocarbon, ketones, naphtha and hexane.

6. The process of claim 5 wherein the amount of organic solvent is about 0.5 to about 100 parts by volume per part of resin produced.

7. The process of claims 1, 3, 4 or 6 wherein the chlorine-containing distillation residue is a by-product of the preparation of vinyl chloride, dichloroethylene, trichloroethylene, tetrachloroethylene, or of the chlorination or oxychlorination of propylene, butadiene, 1-butene, 2-butene, isobutene, cyclobutene, cyclopentadiene, butane, pentane, pentenes or $C_6$ or $C_{40}$ olefins or paraffins.

8. The process of claims 1, 3, 4 or 6 wherein the chlorine-containing distillation residue is a by-product of the preparation of vinyl chloride.

* * * * *